US006801918B1

(12) United States Patent
Mizuno

(10) Patent No.: US 6,801,918 B1
(45) Date of Patent: Oct. 5, 2004

(54) FILE MANAGEMENT APPARATUS AND FILE MANAGEMENT METHOD

(75) Inventor: Toshio Mizuno, Aichi-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/296,619

(22) Filed: Apr. 23, 1999

(30) Foreign Application Priority Data

Apr. 23, 1998 (JP) .......................................... 10-113391

(51) Int. Cl.[7] .............................................. G06F 17/30
(52) U.S. Cl. .................... 707/200; 707/104.1; 715/522; 345/838
(58) Field of Search ................................. 707/200–206, 707/100–104.1, 500.1, 1–10; 345/838

(56) References Cited

U.S. PATENT DOCUMENTS

| | | | | |
|---|---|---|---|---|
| 5,185,887 A | * | 2/1993 | Takahashi et al. .......... | 707/203 |
| 5,226,163 A | * | 7/1993 | Karsh et al. ................ | 707/200 |
| 5,283,892 A | * | 2/1994 | Nakane et al. .............. | 710/260 |
| 5,586,316 A | * | 12/1996 | Tanaka et al. ........... | 707/104.1 |
| 5,657,433 A | | 8/1997 | Murase et al. .............. | 345/433 |
| 5,771,380 A | * | 6/1998 | Tanaka et al. ........... | 707/104.1 |
| 5,859,623 A | * | 1/1999 | Meyn et al. ................ | 345/730 |
| 5,898,430 A | * | 4/1999 | Matsuzawa et al. ..... | 715/500.1 |
| 6,018,744 A | * | 1/2000 | Mamiya et al. .......... | 707/104.1 |
| 6,154,218 A | * | 11/2000 | Murase et al. .............. | 345/619 |
| 6,169,547 B1 | * | 1/2001 | Tanaka et al. .............. | 345/838 |

FOREIGN PATENT DOCUMENTS

| | | |
|---|---|---|
| JP | 9-34755 | 3/1996 |
| JP | 10-228483 | 8/1998 |

OTHER PUBLICATIONS

Microsoft Windows version 3.1, Microsoft Corporation, 1990–1992, 91–98 and 125–126.*

* cited by examiner

Primary Examiner—Shahid Alam
Assistant Examiner—Jean Bolte Fleutantin
(74) Attorney, Agent, or Firm—McDermott Will & Emery LLP

(57) ABSTRACT

In case of a file delete processing in a nonlinear video editing apparatus and so on, it is an a purpose to provide a file management apparatus capable to prevent an user from deleting another file by mistake other than a file to be deleted at a delete processing and a method. Thereof, the file management method storing a data into a storage means in a file format and managing said data wherein said delete object file stored in said storage means is deleted by a delete instruction of an user in a state of displaying contents of said delete object file by reading out of said storage means. And after displaying contents of the delete object file by reading out of said storage means, the delete processing can be canceled.

12 Claims, 13 Drawing Sheets

A data flow diagram at a time of deleting a static image data

FILE MANAGEMENT APPARATUS AND FILE MANAGEMENT METHOD

FIELD OF THE INVENTION

This invention relates to a file management apparatus and the method thereof, and more specially, a file management apparatus deleting a text data, a static image data, and a dynamic image data being stored in a file, and the method thereof.

BACKGROUND OF THE INVENTION

An apparatus such as a personal computer, a working station, a nonlinear video editing apparatus has been proposed as a file management apparatus which stores image data in file format, but the present invention reffers to a nonlinear video editing means as a file management apparatus which can quickly and easily perform the editing of a static image data and a dynamic image data.

The above nonlinear video editing apparatus means an apparatus which combines a mass-storage hard disc with an unit body of a special-purpose computer for editing video data and various kinds of editing boards. In the apparatus, cut frames of a image data can be added, rcplaced and deleted at once by using a mouse, a jog pad and a keyboard, and the image processing as an user expected can be performed in a short time.

In the above nonlinear video editing apparatus, a storage means 103 stores a image data such as a static image data and a dynamic image data, etc. When an user instructs working contents by an operation means 101, a control means 102 performs those processings according to the instruction. Here, when an user wants to delete a file of an image data, the delete processing of a file should be selected by the operation means 101. And a file list is read out from the storage means 103 and then displayed on a screen. When an user selects a file name to be deleted from the displayed file list, a confirmation screen 120 is displayed in order to confirm the delete.

The confirmation screen 120 is composed of a "data delete button" 121 and a "cancel button" 122 as shown in FIG. 14. An user could delete a data by clicking the "data delete button" 121, while cancel the delete processing by clicking the "cancel button" 122.

Although there are some nonlinear video editing apparatus in which a file list can display not only file names but also the first frame of a static image data corresponding to each file, it is file names that are displayed in a personal computer. And in these cases, the confirmation screen can also display only file names same as the above.

In case of a file delete processing in the above nonlinear video editing apparatus and so on, the confirmation screen, which is displayed after an user selects a file to be deleted, is composed of only thc "data delete button" 121 to perform a delete of a data and the "cancel button" 122 to cancel the delete of a data. As the file contents of a static image data and a dynamic image data is not displayed on the confirmation screen, an user cannot confirm the contents of the static image data and the dynamic image data. Therefore, it causes to occur that an user deletes another file instead of a delete-capable file to be deleted.

Even if the file list displays a static image data as the first frame corresponding to each file in addition to file names, whole contents of a dynamic image data is not displayed on the screen. Therefore it is hard to discriminate a file from another with a similar first frame.

SUMMARY OF THE INVENTION

This invention is proposed to resolve the above problems and has a purpose to provide a file management apparatus capable to prevent an user from deleting another file by mistake other than a file to be deleted at a delete processing and a method thereof.

In order to achieve the above purpose, this invention adopts the following means, that is, the file management method storing dynamic image data into a storage means in a file format and managing said data, wherein said delete object file stored in said storage means is deleted by a delete instruction of a user in a state of displaying contents of said delete object file by reading out of said storage means. And after displaying contents of the delete object file by reading out of said storage means, the delete processing can be canceled.

In the concrete, the apparatus is provided with a file designation means 2 specifying a delete object file from a file list by an user's instruction, said file list displayed after being read out of said storage means 3 shown in FIG. 1 by selecting and instructing a delete processing a delete content confirmation means 4 displaying contents of said delete object file specified by said file designation means 2, and a delete execution means 5 delcting said delete object file by a delete instruction. Further more, it is also provided with a delete cancel means 6 canceling to delete the delete object file after the contents of the delete object file is displayed by the delete content confirmation means 4.

Thereby, when an user performs the delete processing of a file, the file contents can be confirmed by a confirmation screen to confirm the file delete. Therefore, it is possible to prevent an user from deleting another file not to be deleted instead of a file to be deleted.

And, in case that the contents of the delete object file is a dynamic image data, the delete content confirmation means 4 displays the contents of the delete object file in a specific screen mode. The specific screen mode can be selected among those of a screen mode displaying the first frame of a dynamic image data in a delete object file, a screen mode displaying the first and the last frames of a dynamic image data in a delete object file, a screen mode displaying frames extracted at intervals of specific even time among those of a dynamic image data in a delete object file, a screen mode displaying specific number of frames among those of a dynamic image data in a delete object file, said frames extracted in sequence by the density transition ratio comparing with just prior frames respectively and the number of said frames selected in advance by an user, a screen mode visualizing all frames by selecting the time from the head of dynamic image data in a delete object file, and a screen mode displaying frames selected in advance by an user among those of dynamic image data in a delete object files.

Therefore, at the time of a file delete, the confirmation screen displays the file contents as more easy to understand and an user can perform the delete processing after confirming the file content.

PREFERRED EMBODIMENTS OF THE INVENTION (Embodiment 1)

It will be explained hereinafter a processing for deleting a dynamic image data stored in a storage means by an user in case of applying the present invention to a nonlinear video editing apparatus, referring to drawings.

Figure 1:
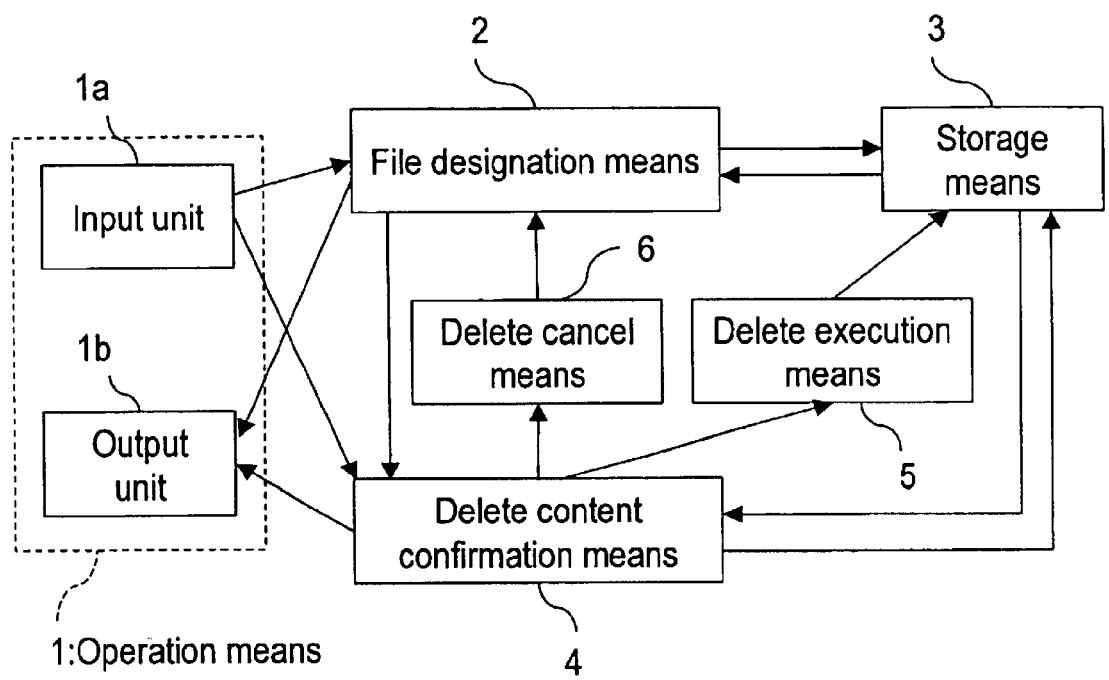
FIG. 1 is a functional block diagram showing a constitution of an embodiment in this invention.
Figure 2:
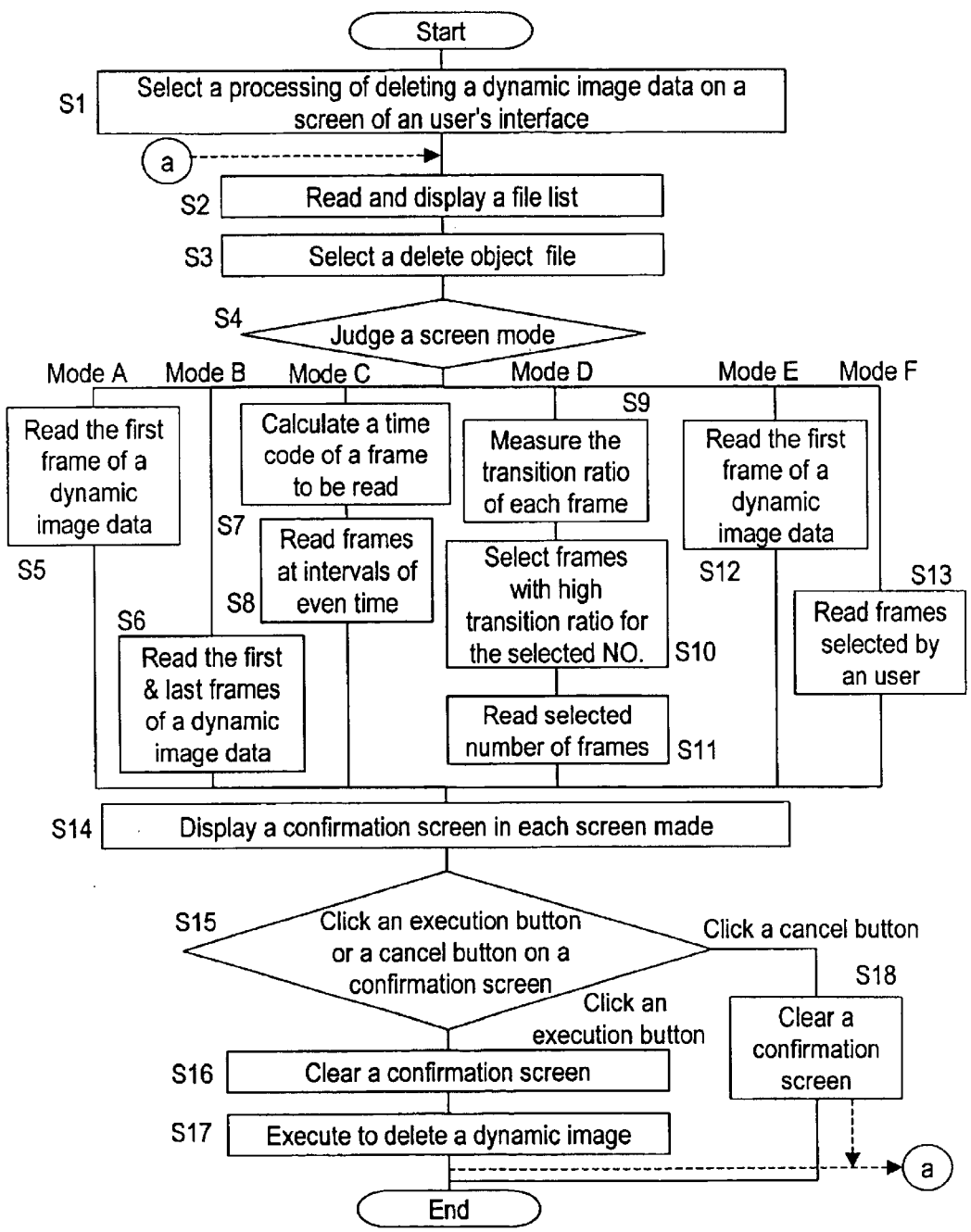
FIG. 2 is a flow diagram showing an operation process at a delete processing of a file in an embodiment of this invention.

FIG. 1 is a functional block diagram showing a constitution of an embodiment in this invention, and FIG. 2 is a flow diagram at a time of a delete processing or a file in this embodiment.

First, when an user selects a delete processing of a file by an input unit 1a of an operation means 1 shown in FIG. 1, a file designation means 2 gains access to a storage means 3 and reads out a file list of files stored in the storage means 3. And the file list is displayed on a screen of an output unit 1b of the operation means 1 (Step S1→S2, FIG. 2). Next, when the user selects a delete object file, that is a file name of a dynamic image data to be deleted, from the file list, the delete content confirmation means 4 reads the selected file In the storage means 3. The contents of the file is displayed as a confirmation screen on a screen of the output unit 1b in a specific screen mode described after (Step S3).

The screen modes which display-contents of a delete object file are: (1) a mode A displaying the first frame; (2) a mode B displaying the first frame and the last frame; (3) a mode C displaying frames at intervals of even time; (4) a mode D displaying selected frames according to the transition ratio of each frame; (5) a mode E displaying all frames by a time axis scroll bar; (6) a mode F displaying arbitrary frames selected by an user.

Then, the user selects one among the above-mentioned modes, which has to be set on the delete content confirmation means 4 in advance. And in the mode C and the mode D, the user can input number of frames to be displayed on the confirmation screen at the time of the mode selection. The number of frames thus inputted by the user is set on the delete content confirmation means 4 together with the selected mode.

If the mode F is selected, it is configured that an user can select arbitrary frames to be displayed on the confirmation screen at the time of editing a dynamic image data and so on.

After selecting the delete object file by an user, the confirmation screen is to be displayed according to the following process. The delete content confirmation means 4 judges the screen mode selected in advance as above, and reads necessary frames from the delete object file in the storage means 3. The frames are displayed as the confirmation screen according to the screen mode respectively (Step S4). The processing in each screen mode is explained referring to examples of confirmation screens. The confirmation screen in each screen mode displays a "data delete button" M instructing to delete the delete object file and a "cancel button" N canceling to delete the delete object file.

Figure 3:
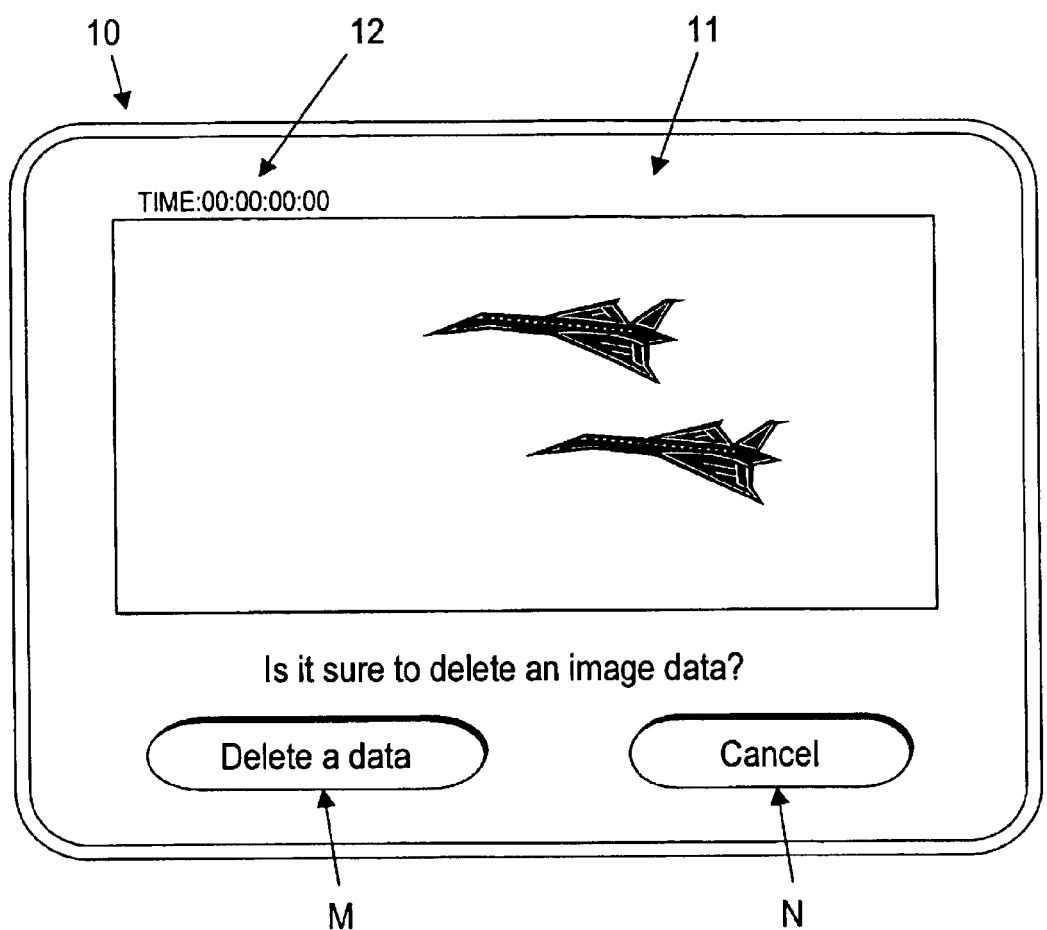
FIG. 3 is a constitutional diagram of a screen showing an example of a confirmation screen in an embodiment of this invention.

(1) In case of the mode A the delete content confirmation means 4 reads the first frame in the delete object file from the storage means 3 (Step S5), and displays a confirmation screen 10 composed of a static image data 11 of the first frame, a time code 12 corresponding to the frame, the "data delete button" M, and the "cancel button" N as shown in FIG. 3 (Step S14).

Figure 4:
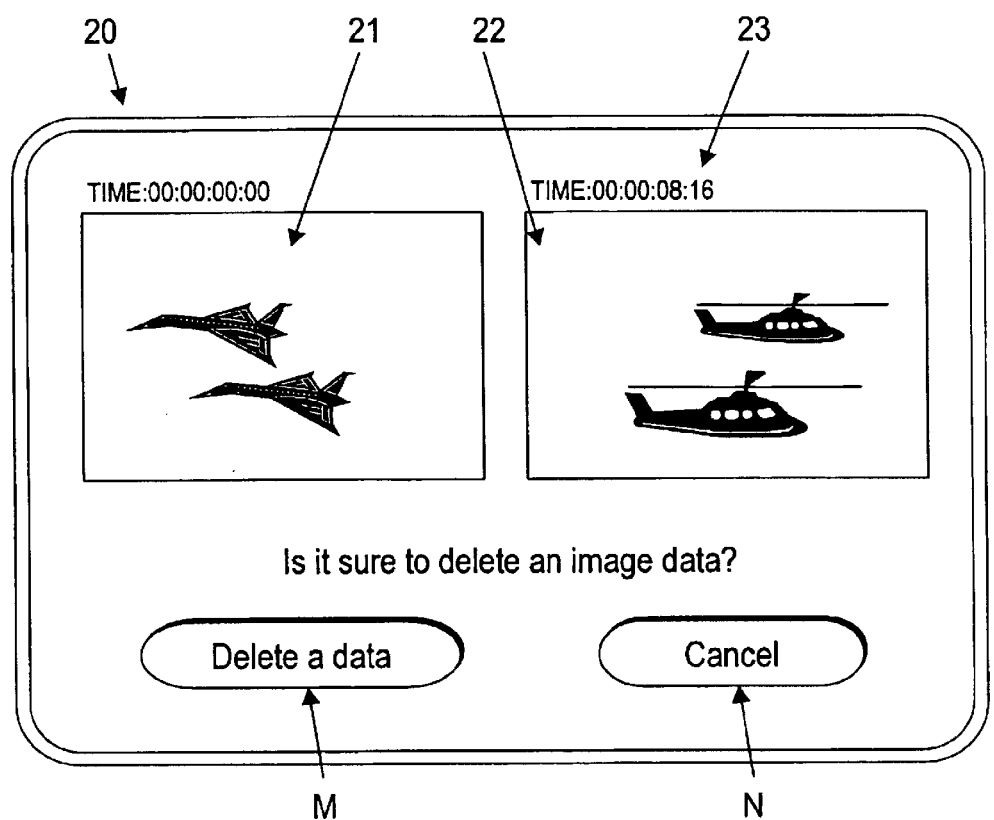
FIG. 4 is a constitutional diagram of a screen showing an example of a confirmation screen in an embodiment of this invention.

(2) In case of the mode B, the delete content confirmation means 4 reads the first and the last frames in the delete object file from the storage means 3 (Step S6), and displays a confirmation screen 20 composed of a static image data 21 of the first frame, a static image data 22 of the last frame, time codes 23 corresponding to these frames, the "data delete button" M, and the "cancel button" N as shown in FIG. 4 (Step S14).

Figure 5:
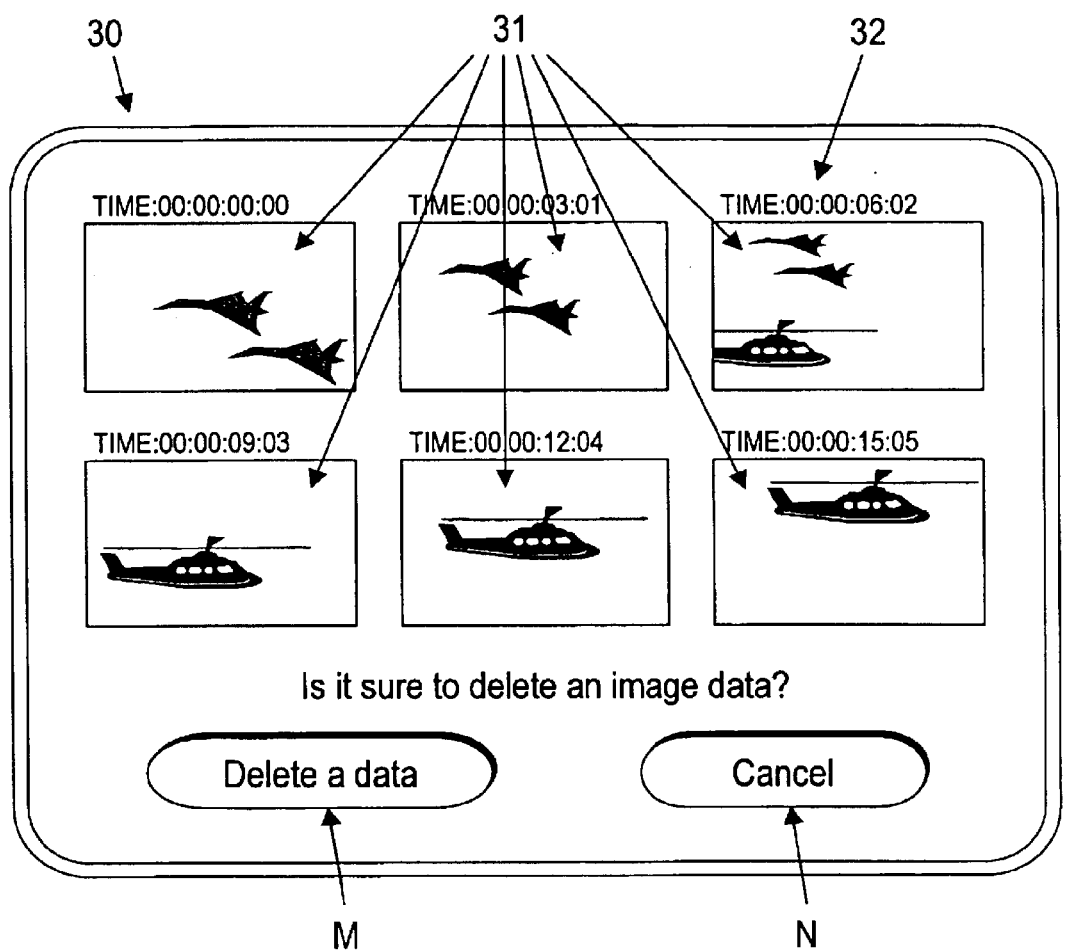
FIG. 5 is a constitutional diagram of a screen showing an example of a confirmation screen in an embodiment of this invention.

(3) In case of the mode C, the delete content confirmation means 4 calculates time codes of frames at intervals of even time according to the editing time of the delete object file and the number of frames set in the delete content confirmation means 4 (Step S7). and then reads frames corresponding to the time codes including the first and the last frames from the storage means 3 (Step S8). A confirmation screen 30 is displayed as composed of static image data 31 of the frames corresponding to the calculated time codes, time codes 32 corresponding to each frame, the "data delete button" M, and the "cancel button" N as shown in FIG. 5 (Step S14).

Figure 6:
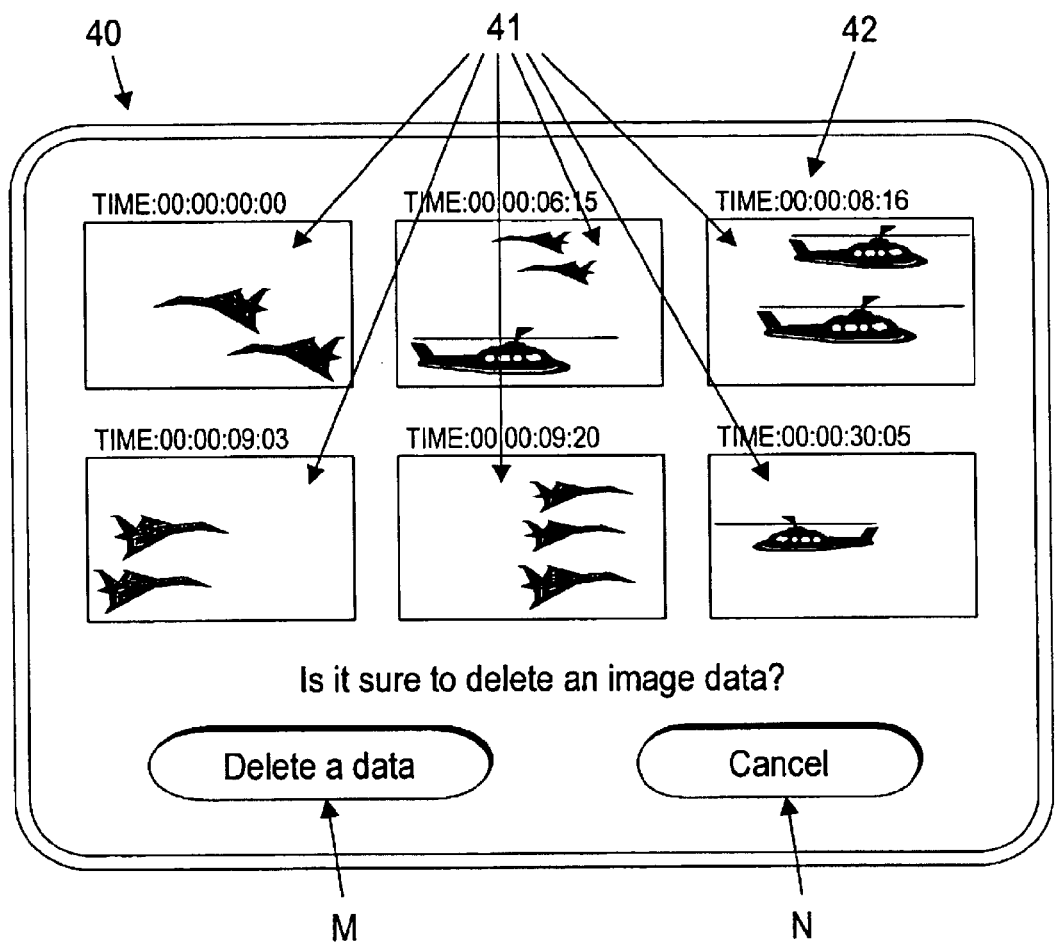
FIG. 6 is a constitutional diagram of a screen showing an example of a confirmation screen in an embodiment of this invention.

(4) In case of the mode A the delete content confirmation means 4 calculates the frame transition ratio of respective frame in a dynamic image data according to the method described after, selects frames with a large value of the frame transition ratio in sequence for the number of frames set in advance in the delete content confirmation means 4 (Step S9→S10). The selected frames are read out from the storage means 3 by the delete content confirmation means 4 (Step S11). And the confirmation screen 40 is displayed as composed or static image data 41 with a large frame transition ratio, time codes 42 corresponding to each frame, the "data delete button" M, and the "cancel button" N as shown in FIG. 6 (Step S14). And the confirmation screen 40 may display each frame either in the sequence of time indicated by the time codes 42 or in the sequence of the transition ratio.

In this embodiment, the frame transition ratio can be calculated as follows. First, regarding each pixel of composing a frame to calculate the frame transition ratio (which is called an object frame) and its prior frame, a pixel at specific position of an object frame is compared with another pixel at the same position of its prior frame respectively. If either one of RGB values of two pixels is changed over a specific threshold value, said pixel is to be a changing point. The same comparison is made all over the pixels, and the changing points should be calculated. The number counting the changing points thus calculated is called a frame transition ratio of the object frame. By performing this operation all over the frames of a dynamic image data, the frame transition ratio of all frames are calculated.

Figure 7:
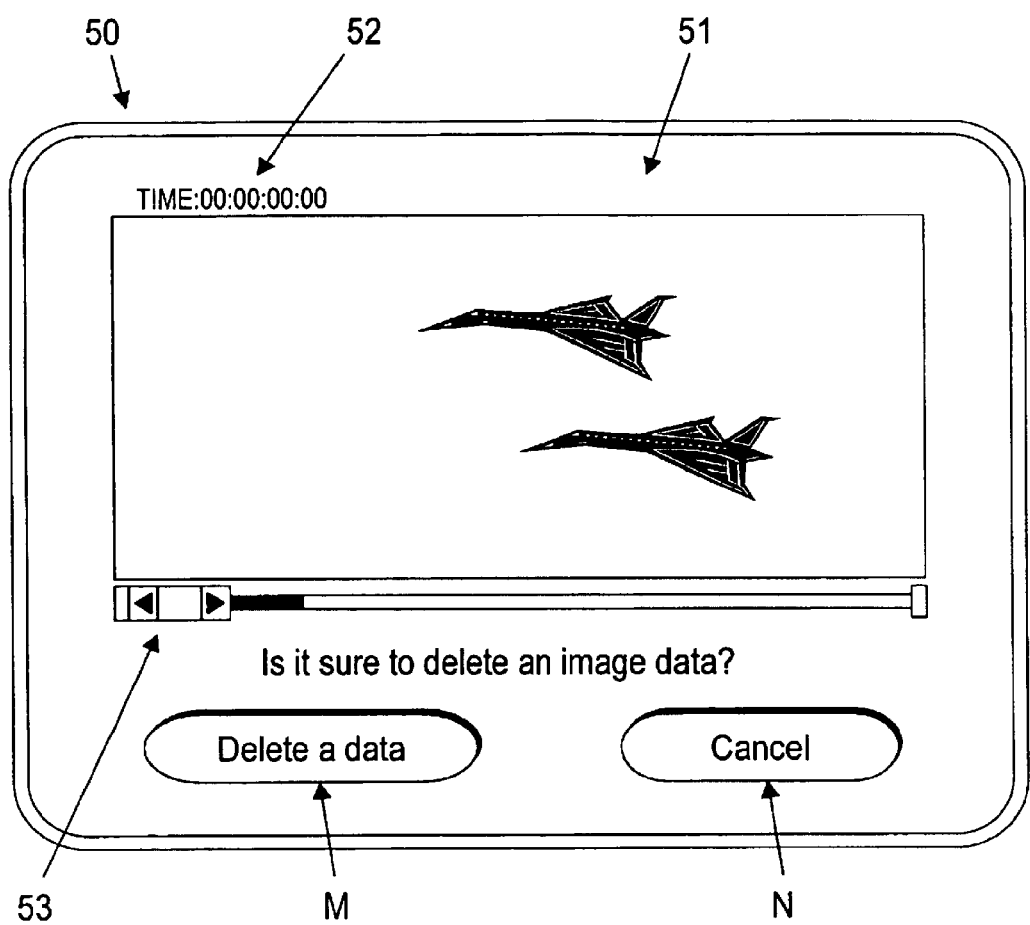
FIG. 7 is a constitutional diagram of a screen showing an example of a confirmation screen in an embodiment of this invention.

(5) In case of the mode E, the delete content confirmation means 4 reads the first frame in the delete object file from the storage means 3 (Step S12), and displays the confirmation screen 50 composed of a static image data 51 of the first frame, a time code 52 corresponding to the frame, a time axis scroll bar 53 displaying a dynamic image data corresponding to time, the "data delete button" M, and the "cancel button" N (Step S14) as shown in FIG. 7 (Step S14).

Here, when an user clicks the time axis scroll bar 53 by the operation means 1, the delete content confirmation means 4 reads frames of the time corresponding to the position of the time axis scroll bar 53 from the storage means 3. The frames are displayed as the confirmation screen 50 together with time codes 52 corresponding to the dynamic image data. As above, an user clicks the time axis scroll bar 53 if necessary, so that all framcs in the delete object file can be read out and displayed on the delete confirmation screen 50.

Figure 8:
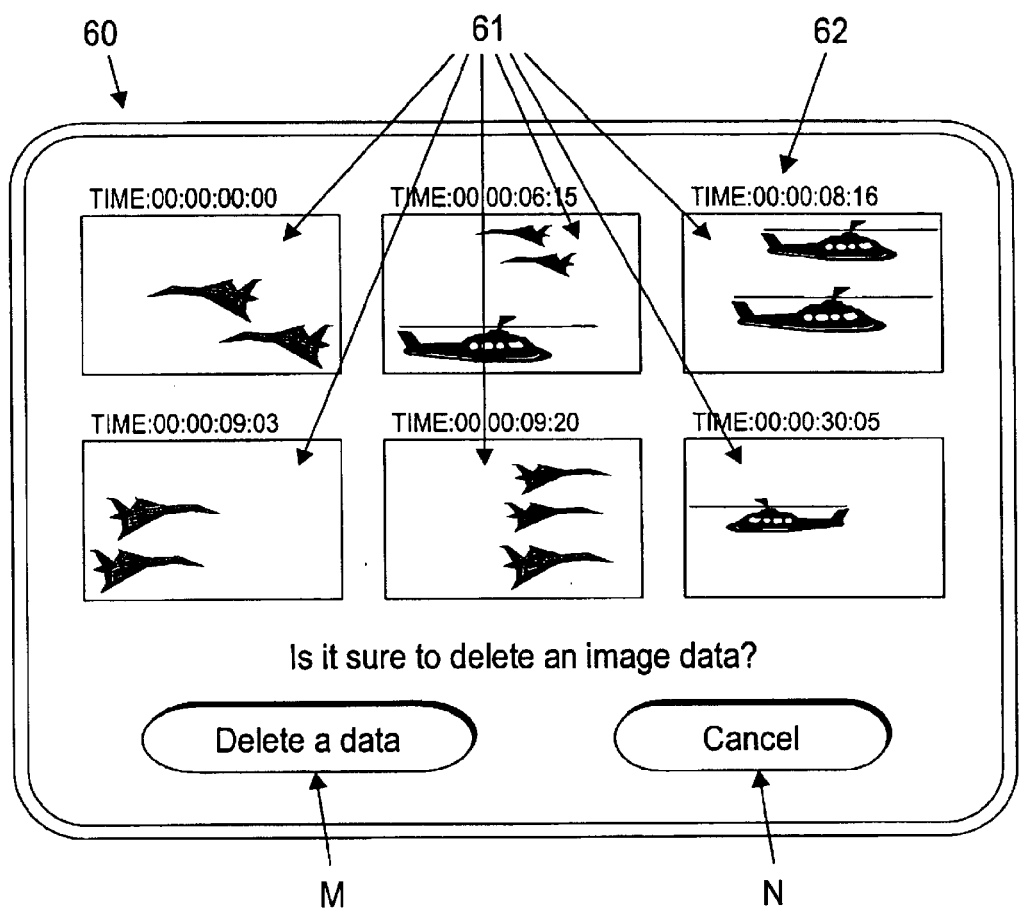
FIG. 8 is a constitutional diagram of a screen showing an example of a confirmation screen in an embodiment of this invention

(6) In case of the mode F, the delete content confirmation means 4 reads frames selected in advance by an user at the lime of editing and etc. from the storage means 3 (Step S13), and displays the confirmation screen 60 as composed of static image data 61 of frames selected by an user, time codes 62 corresponding to each frame, the "data delete button" M, and the "cancel button" N as shown in FIG. 8 (Step S14).

By the confirmation screen corresponding to each mode displayed as above, an user confirms the contents of the delete object file. If the contents is a dynamic image data of a delete-capable file, the user clicks/inputs the "data delete button" M by the operation means 1 (Step S15). The delete content confirmation means 4, according to the instruction, sends the delete instruction of the delete object file to the delete execution means 5 while clearing the confirmation screen, and then the delete execution means 5 deletes the delete object file in the storage means 3 (Step S16→S17).

When the contents is a dynamic image data not to be deleted, the user clicks/inputs the "cancel button" N by the operation means 1. And the delete content confirmation means 4 clears the confirmation screen, and the delete cancel means 6 cancels the delete processing of the delete object file in the storage means 3 (Step S18).

The operation process after executing or canceling the delete processing of a delete object file can be set either to terminate the delete processing or to return to the screen displaying the file list (the flow is illustrated by a dotted line in FIG. 2). When the screen returns to the display of the file list, the termination processing can be selected and thereby the delete processing can be finished.

When an user performs the above delete processing of a dynamic image data stored in the storage means, the dynamic image data of the file contents is displayed as the confirmation screen on the screen of the operation means. The user can delete the filc after confirming the file contents to be deleted Therefore, as the user can confirm contents of a file as above, it is possible to prevent the user from deleting another file not to be deleted by mistake.

In this embodiment, the explanation is made in case of the delete processing of a dynamic image data in a nonlinear video editing apparatus, but this invention is not restricted to it. In case of managing a dynamic image data by a personal computer and so on this invention can be also applied.

And in this embodiment, the explanation is made in case of the operation of only one unit of a nonlinear video editing apparatus, but this invention is also applied in case of a plural nonlinear video editing apparatus connected with the storage means via network (Embodiment 2)

Figure 9:
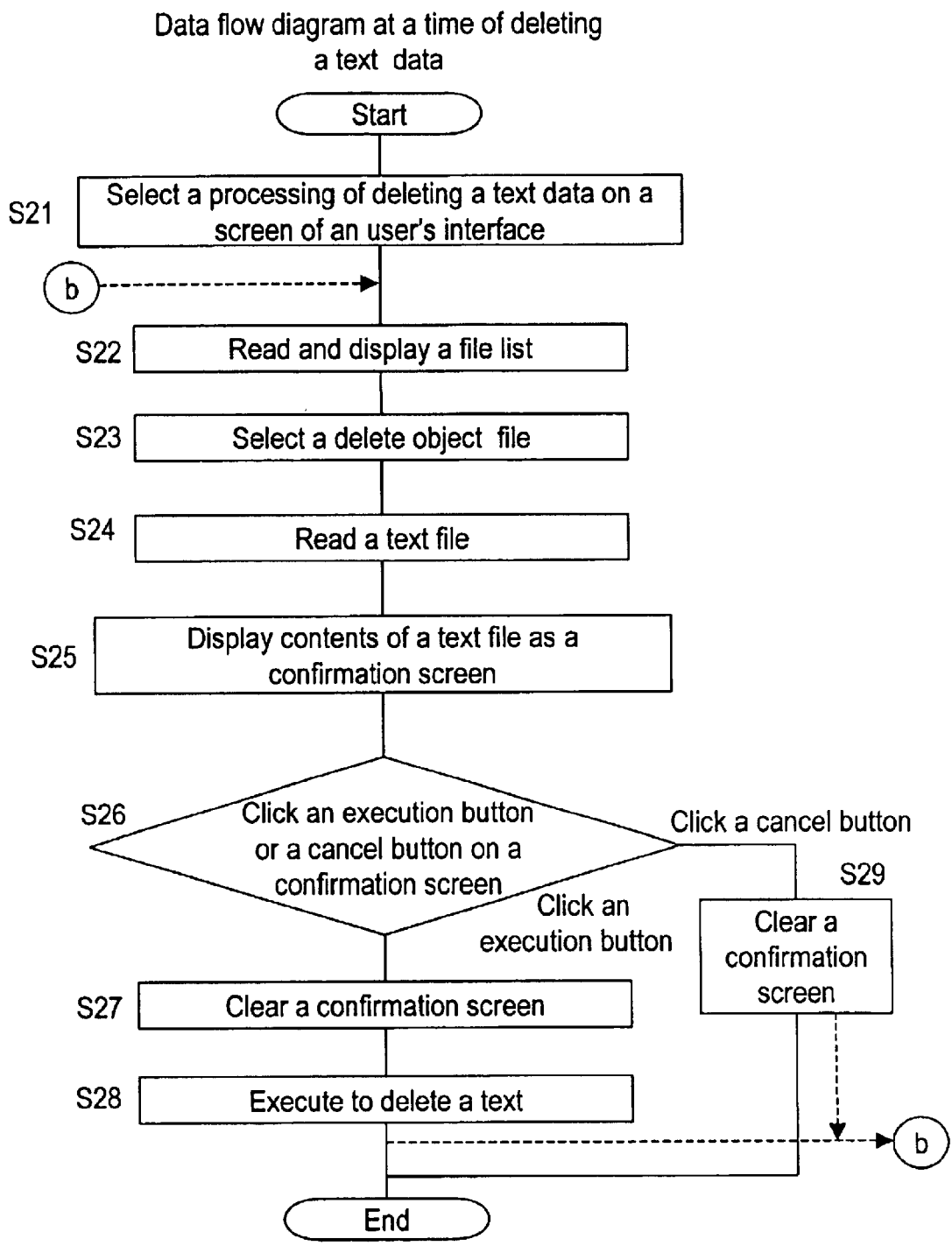
FIG. 9 is a flow diagram showing an operation process at a delete processing of a file in another embodiment of this invention.
Figure 10:
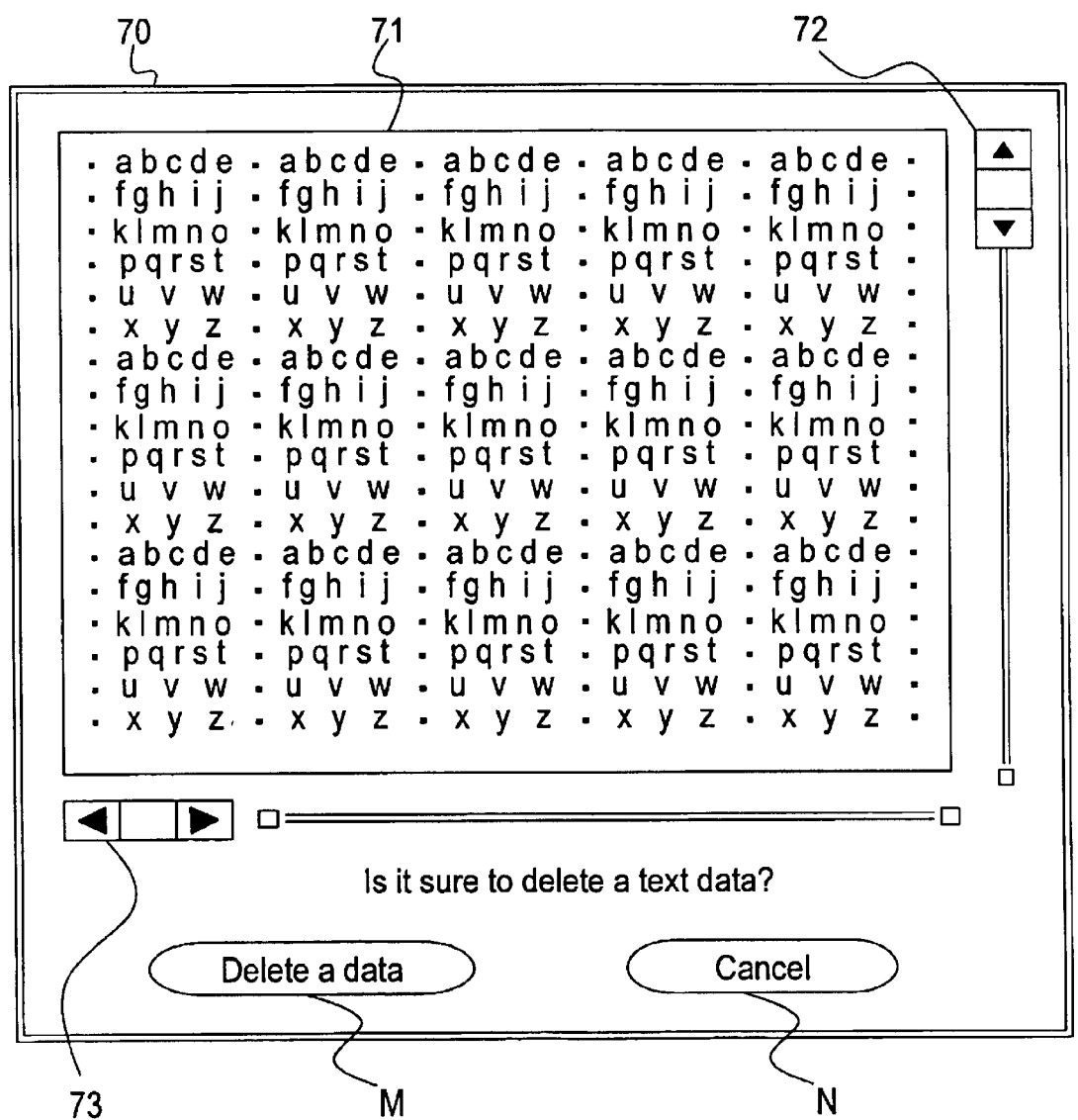
FIG. 10 is a constitutional diagram of a screen showing an example of a confirmation screen in another embodiment of this invention.

It will be explained hereinafter a processing for deleting a text data stored in a storage means by an user in case of applying the present invention to a personal computer, referring to drawings The constitution of this embodiment 2 which is same as of the embodiment 1, will be explained according to the FIG. 1. FIG. 9 is a flow diagram at a time of a delete processing for a file in this embodiment of the present invention. FIG. 10 is a constitutional diagram of a screen showing an example of a confirmation screen.

First, when an user selects a delete processing for file by an input unit 1*a* of an operation means 1 as shown in FIG. 1, a file designation means 2 gains access to a storage means 3 and then reads a file list of files stored in the storage means 3. The file list is displayed on a screen of an output unit 1*b* of the operation means 1 Step S21→S22, FIG. 9). Next, the user selects a file name to be deleted from the file list (a delete object file), and a delete content confirmation means 4 reads the selected file from the storage means 3. The contents is displayed as a confirmation screen 70 on a screen of the output unit 1*b* (Step S23→S24→S25).

The confirmation screen 70 displays a text data 71, a scroll bar 72 scrolling the text data 71 up and down, a scroll bar 73 scrolling the text data 71 right and left, a "data delete button" M instructing to delete the delete object file, and a "cancel button" N canceling to delete the delete object file. The user can confirm the contents of the text data 71 along with scrolling up and down by the scroll bar 72 or right and left by the scroll bar 73.

By the confirmation screen 70 thus displayed, the user confirms the contents of the delete object file. If the contents is a data certainly permitted to be deleted, the user clicks/inputs the "data delete button" M by the operation means 1 (Step S26). According to the instruction the delete content confirmation means 4 clears the confirmation screen 70 and sends the instruction of deleting the delete object file to a delete execution means 5 (Step S27). Thereby the delete execution means 5 executes the delete of the delete object file stored in the storage means 3 (Step S28).

If the contents is a data not to be deleted, the user clicks/inputs the "cancel button" N by the operation means 1. And the delete content confirmation means 4 clears the confirmation screen, while the delete cancel means 6 cancels to delete the delete object file in the storage means 3 (Step S29).

The operation process after executing or canceling to delete the delete object file is same as the aforementioned embodiment.

As above, when the user deletes a text data stored in the storage means 3, a text data of the file content is displayed as the confirmation screen 70 on a screen of the operation means 1. After the user confirms the file contents to be deleted by the confirmation screen 70, the delete-capable file can be deleted. Therefore, as the user can confirm the file contents, it is possible to prevent an the user from deleting a file not to be deleted by mistake.

(Embodiment 3)

It will be explained hereinafter a processing for deleting a static image data stored in a storage means by an user in case of applying the present invention to a personal computer, referring to drawings.

Figure 11:
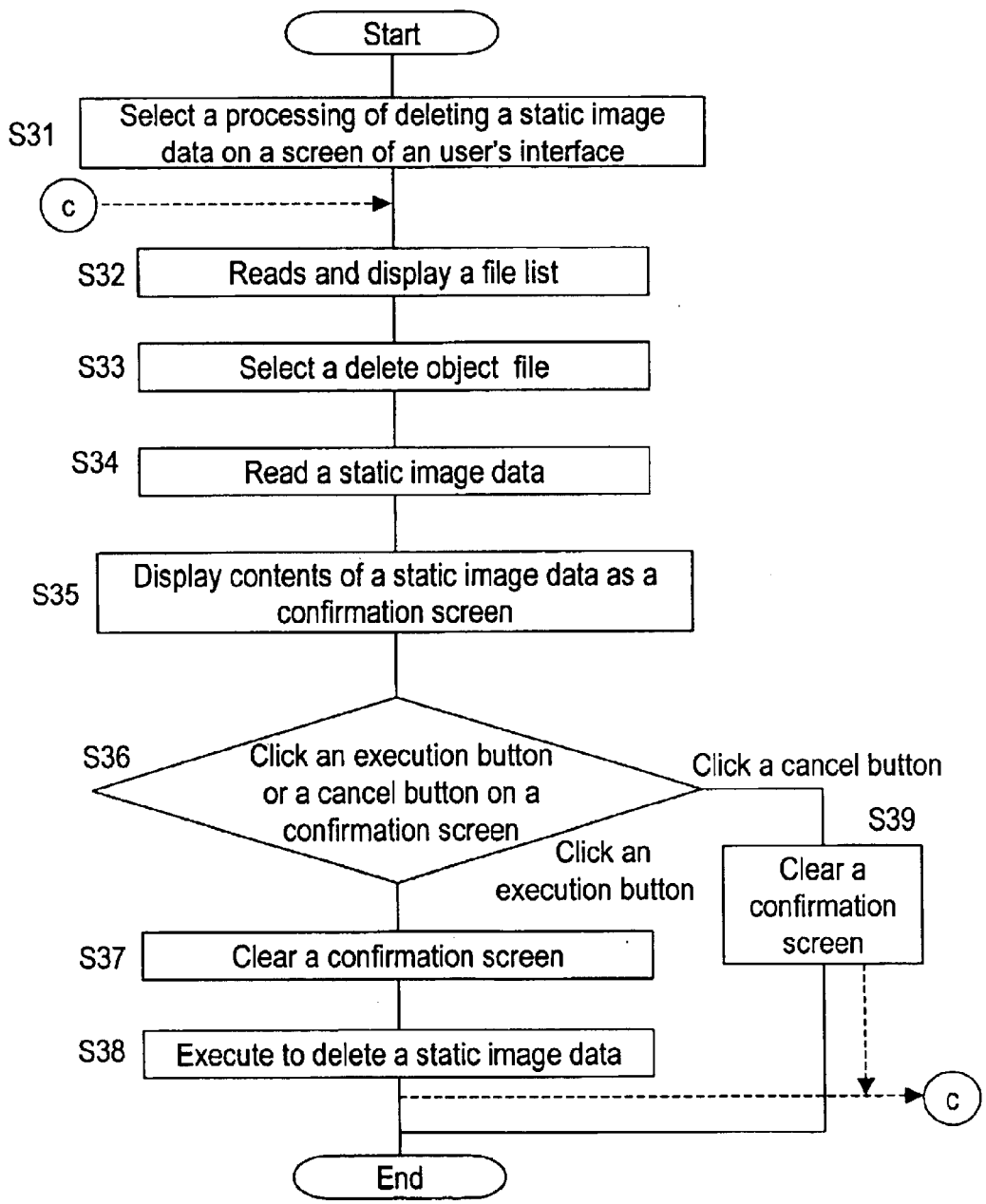
FIG. 11 is a flow diagram showing an operation process at a delete processing of a file in another embodiment of this invention.
Figure 12:
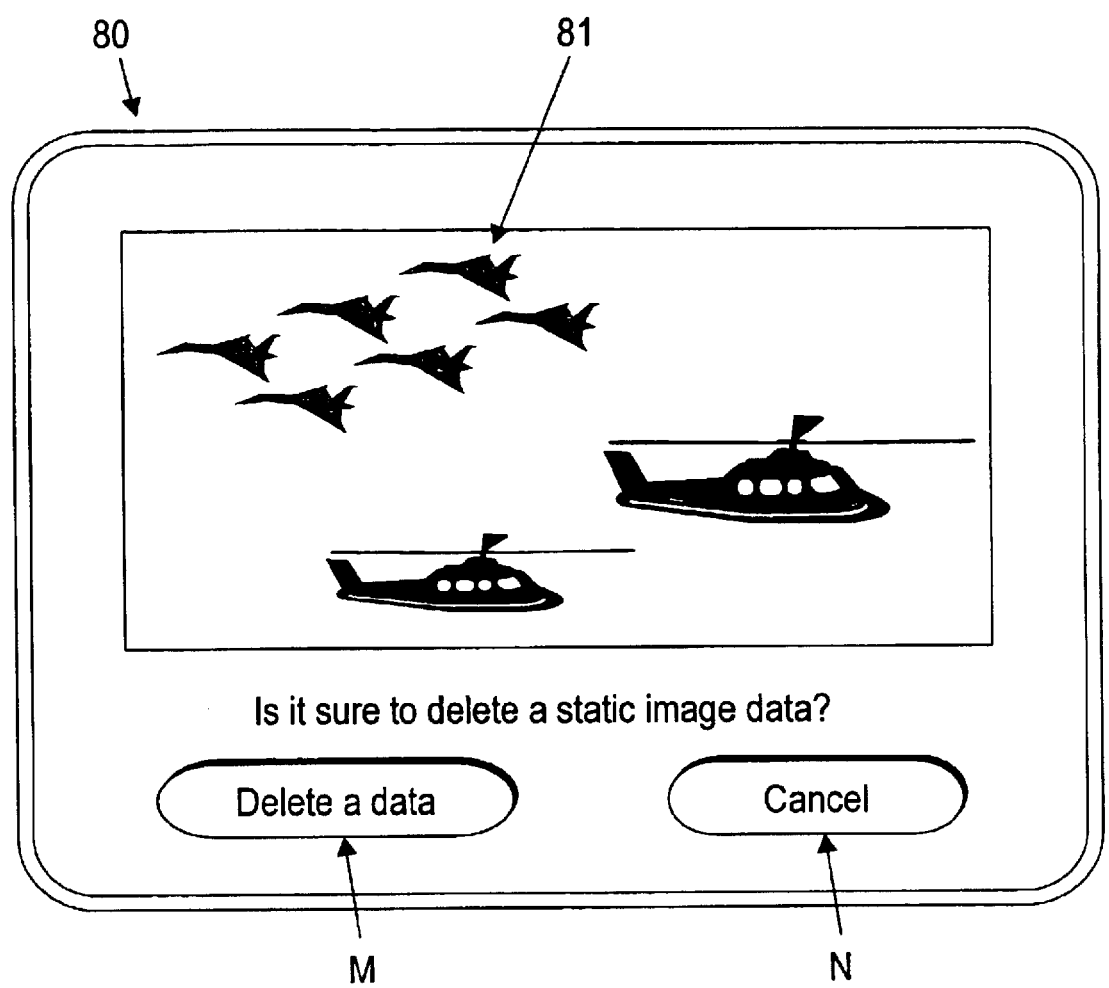
FIG. 12 is a constitutional diagram of a screen showing an example of a confirmation screen in another embodiment of this invention.
Figure 13:
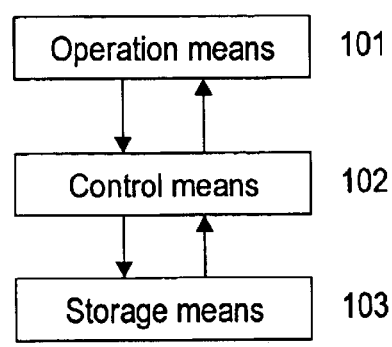
FIG. 13 is a functional block diagram in a conventional invention.
Figure 14:
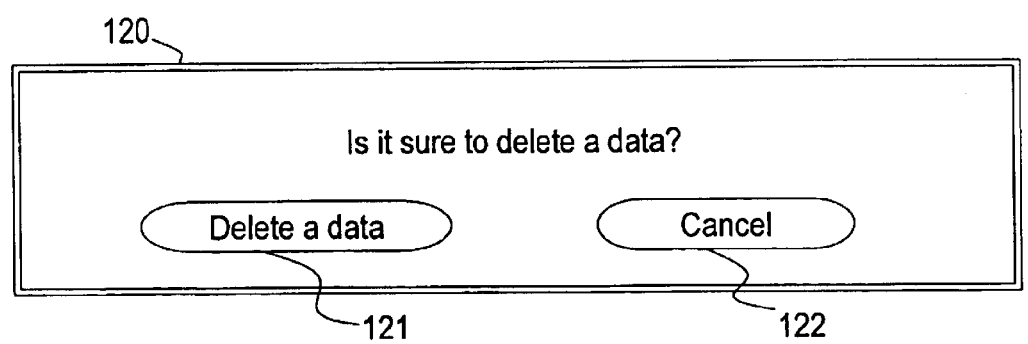
FIG. 14 is a constitutional diagram of a screen in a conventional invention.

The constitution of this embodiment 3, which is same as of the above embodiments, will be explained according to the FIG. 1. FIG. 11 is a flow diagram at a time of a delete processing for a file in this embodiment of the present invention FIG. 12 is a constitutional diagram of a screen showing an example of a confirmation screen.

First, when an user selects a delete processing for a file by an input unit 1a of an operation means 1 as shown in FIG. 1, a file designation means 2 gains access to a storage means 3 and then reads a file list of files stored in the storage means 3. The file list is displayed on a screen of an output unit 1b of the operation means 1 (step S31→S32, FIG. 11). Next, the user selects a file name of a static image data to be deleted from the file list (a delete object file), and a delete content confirmation means 4 reads the selected file from the storage means. The contents is displayed as a confirmation screen 80 on a screen of the output unit 1b (Step S33→S34→S35).

The confirmation screen 80 displays a static image data 81, the "data delete button" M instructing to delete the delete object file, and the "cancel button" N canceling to delete the delete object file.

By the confirmation screen 80 thus displayed, the user confirms the contents of the delete object file. If the content is a static image data permitted certainly to be deleted, the user clicks/inputs the "data delete button" M by the operation means 1. If the contents is a static image data not to be deleted, the user clicks/inputs the "cancel button" N by the operation means 1 (Step S36). The operation process after these steps (Step S37~S39), which is same as of above-mentioned embodiments respectively, will not be explained here.

As above, in case that the user deletes a static image data store in the storage means 3, the screen on the operation means 1 displays the static image data of the file content as the confirmation screen. The user can delete the file after confirming the file contents to be deleted. Therefore the user can confirm the file contents so that it is possible to prevent an user from deleting a file not to be deleted by mistake.

And in the embodiment 2 and 3, the explanation is made in case of the operation of only one unit of a personal computer, but this invention is also applied in case of a plural personal computer connected with the storage means via network.

When a file stored in the storage means is deleted according to this invention described above, the file contents is displayed as a confirmation screen after selecting the delete object file. The user can delete a file after confirming the file contents thereby. Therefore, there is a effect that an user does not make a mistake to delete a file not to be deleted.

And if the delete object file is a dynamic image data the screen modes displaying the file contents on the confirmation screen, are a mode displaying the first frame, a mode displaying the first and last frames, a mode displaying frames on intervals of even time, a mode displaying selected frames according to the frame transition ratio, a mode displaying all frames with a time axis scroll bar, and a mode displaying arbitrary frames selected by an user. As the user can select one screen mode from those screen modes in advance, the file content is displayed more clearly when the user delete a file. Thereby the user can delete the file after confirming the file contents. Accordingly, it can get more advanced effect than the above described effect.

What is claimed is:

1. A file management apparatus for storing dynamic image data into a storage means in a file format and managing said data, comprising:
   a file designation means specifying a delete object file for deletion in response to a user's instruction,
   a delete content confirmation means displaying at least a partial image content of said delete object file specified by said file designation means, and
   a delete execution means deleting said delete object file in response to a delete instruction;
   wherein the delete object file contains dynamic image data, and
   wherein said delete content confirmation means displays the delete object on a confirmation screen according to a display mode selected by a user from a plurality of display modes, and each of the plurality of display modes specifies at least one frame of the dynamic image data contained in the delete object to be displayed in a different way from other modes.

2. The file management apparatus defined in claim 1, further comprising a delete cancel means for canceling deletion of said delete object file after said delete content confirmation means displays the at least one frame on the confirmation screen.

3. The file management apparatus defined in claim 1, wherein said plurality of display modes include a mode displaying the first frame of the dynamic image data in the delete object file.

4. The file management apparatus defined in claim 1, wherein said plurality of display modes include a mode displaying the first and the last frame of the dynamic image data in the delete object file.

5. The file management apparatus defined claim 1, wherein said plurality of display modes include a mode displaying frames extracted from the dynamic image data in the delete object file in equal intervals.

6. The file management apparatus defined in claim 1, wherein said plurality of display modes include a mode displaying a specific number of frames of the dynamic image data in the delete object file that have high frame transition ratios, the specific number of frames being selected in advance by a user.

7. The file management apparatus defined claim 1, wherein said plurality of display modes includes a mode that allows viewing all frames by selecting the time of the dynamic image data in the delete object file.

8. The file management apparatus defined in claim 1, wherein said plurality of display modes include a mode displaying frames selected from the dynamic image data in the delete object files by a user.

9. The file management apparatus defined in claim 1, wherein said delete content confirmation means displays the at least one frame of the dynamic image data and a time code corresponding to the at least one frame of the dynamic image data on the confirmation screen.

10. A file management method for managing dynamic image data comprising the steps of:
    receiving a first instruction designating a file to be deleted, wherein the designated file contains dynamic image data;
    determining a display mode selected by a user from a plurality of display modes, wherein each of the plurality of display modes specifies at least one frame of the dynamic image data to be displayed in a different way from other modes;

reading at least one frame of the dynamic image data according to the display mode selected by the user;

displaying the designated file on a confirmation screen based on the display mode selected by the user;

receiving a second instruction; and deleting the designated file in response to the second instruction being a delete instruction.

11. The file management method defined in claim 10, wherein, when the second instruction represents not to delete the designated file, the deleting step is not carried out.

12. A machine-readable medium bearing instructions for managing files stored in a data processing system, said instructions being arranged, when executed, to cause the data processing system to perform the steps of:

receiving a first instruction designating a file to be deleted, wherein the designated file contains dynamic image data;

determining a display mode selected by a user from a plurality of display modes, wherein each of the plurality of display modes specifies at least one frame of the dynamic image data to be displayed in a different way from other modes;

reading the at least one frame of the dynamic image data according to the display mode selected by the user;

displaying the designated file on a confirmation screen based on the display mode selected by the user;

receiving a second instruction; and deleting the designated file in response to the second instruction being a delete instruction.

* * * * *